United States Patent [19]

Shalaby et al.

[11] Patent Number: 5,491,198

[45] Date of Patent: Feb. 13, 1996

[54] PROCESS FOR PHOSPHONYLATING THE SURFACE OF AN ORGANIC POLYMERIC PREFORM

[75] Inventors: Shalaby W. Shalaby, Anderson; M. Scott McCaig, Clemson, both of S.C.

[73] Assignee: Clemson University, Clemson, S.C.

[21] Appl. No.: 188,478

[22] Filed: Jan. 28, 1994

Related U.S. Application Data

[63] Continuation-in-part of Ser. No. 68,297, May 27, 1993, abandoned, which is a continuation of Ser. No. 840,020, Feb. 24, 1992, abandoned.

[51] Int. Cl.$^6$ ................................................... C08F 8/40
[52] U.S. Cl. ................................... 525/340; 623/16
[58] Field of Search ............................................. 525/340

[56] References Cited

U.S. PATENT DOCUMENTS

| | | | |
|---|---|---|---|
| 3,023,180 | 2/1962 | Canterino | 525/340 |
| 3,069,372 | 12/1982 | Schroeder | 525/340 |

FOREIGN PATENT DOCUMENTS

| | | |
|---|---|---|
| 3583 | 1/1971 | Japan. |
| 876045 | 8/1961 | United Kingdom. |

Primary Examiner—Christopher Henderson
Attorney, Agent, or Firm—Dority & Manning

[57] ABSTRACT

A process for phosphonylating the surface of an organic polymeric preform and the surface-phosphonylated preforms produced thereby are provided. Organic polymeric preforms made from various polymers including polyethylene, polyetheretherketone, polypropylene, polymethylmethacrylate, polyamides, and polyester, and formed into blocks, films, and fibers may have their surfaces phosphonylated in a liquid-phase or gas phase reaction. Liquid phase phosphonylation involves the use of a solvent that does not dissolve the organic polymeric preform but does dissolve a phosphorus halide such as phosphorus trichloride. The solvent chosen must also be nonreactive with the phosphorus halide. Such solvents available for use in the present process include the fully-halogenated liquid solvents such as carbon tetrachloride, carbon tetrabromide, and the like. Gas phase phosphonylation involves treating the organic polymeric preform with a gaseous phosphorus halide such as phosphorus trichloride and oxygen. The inventive processes allow for surface phosphonylation of the organic polymeric preform such that up to about 30 percent of the reactive carbon sites in the polymer are phosphonylated. The inventive phosphonylated organic polymers are particularly useful as orthopedic implants because hydroxyapatite-like surfaces which can be subsequently created on the organic implants allow for co-crystallization of hydroxyapatite to form chemically-bound layers between prosthesis and bone tissue.

14 Claims, No Drawings

PROCESS FOR PHOSPHONYLATING THE SURFACE OF AN ORGANIC POLYMERIC PREFORM

CROSS REFERENCES TO RELATED APPLICATIONS

This application is a continuation-in-part of U.S. Ser. No. 08/068,297 filed May 27, 1993, now abandoned which is fully incorporated by reference and which is a file wrapper continuation of U.S. Ser. No. 07/840,020 filed Feb. 24, 1992, and now abandoned.

FIELD OF THE INVENTION

A process for phosphonylating the surface of an organic polymeric preform and the surface-phosphonylated preform produced thereby are provided.

BACKGROUND OF THE INVENTION

Polymers having chemically and physically surfaces have broad potential uses, particularly in the areas of separations and electronic and biomedical devices. For example, in the biomedical field, surface-modified polymers are potentially useful as implantable devices that exhibit hydroxyapatite-like surfaces. Such hydroxyapatite-like surfaces have the unique ability to support osteointegration with bone tissues.

Total joint replacement has enjoyed substantial success in orthopedic surgery. Two methods are currently employed for fixating the load-bearing implants within bone tissue. Those methods include: (1) the use of grouting materials such as poly(methyl methacrylate) (PMMA) as bone cement between the bone and the prosthesis; and (2) direct opposition of bone tissue onto porous and non-porous implant surfaces. The latter method is known as the "cementless hip replacement" and has been gaining in clinical acceptance despite certain disadvantages.

In using the cementless implant method, a prosthesis is coated with hydroxyapatite which is a major inorganic component of bone. The hydroxyapatite-coated prosthesis is then implanted in the bone cavity. The hydroxyapatite, which is a calcium salt is believed to facilitate osteointegration with the bone tissues. After partial integration of the hydroxyapatite-coated prosthesis with the bone, layers of hydroxyapatite can be detected between the prosthesis and the bone tissues.

Despite the success of metal femoral components in many patients, long term data has demonstrated an unacceptably high failure rate in more active patients due to loosening of the femoral stem caused by bone resorption around the implant. Bone resorption results from stress shielding of the bone around the implant due to the high modulus of the metal stem coupled with unstable fixation of the stem in the surrounding hard tissue.

The failure to achieve bone ingrowth into the surface of the implant to support implant mechanical stability has been a major problem with cementless replacements. Surfaces of the currently-employed metallic implants have been treated with hydroxyapatite in an attempt to overcome this problem and induce bone ingrowth about the prosthesis as described above. Mechanical tolerances of the implant-bone interface have been improved somewhat, but the mechanical stability of the interface still suffers from dislodgement of the prosthesis from the bone cavity. Further aggravation occurs due to the stiffness mismatch of the implant and bone which leads to bone resorption.

Interest in high-performance thermoplastic load-bearing implants has grown significantly over the past few years. Because bone tissue itself is a composite material composed of hydroxyapatite ceramic-reinforced collagen, polymeric matrix composites are believed to be capable of remedying problems associated with metal stems. Benefits of a composite prosthetic material include a relatively low elastic modulus compared to current implant metals, the absence of metal ion releases in the body, and the ability to customize the strength required for the implant to best suit a particular design requirement. Non-metallic composite prostheses are generally lightweight and outperform the metallic prostheses in terms of strength and stability on a per mass basis. Health problems created by potentially carcinogenic metallic alloys can also avoided when non-metallic, generally ceramic composite, prostheses are employed.

Of particular interest as polymeric implants are the polyetheretherketone (PEEK) fiber-reinforced composites such as those entailing carbon fibers. PEEK exhibits considerable chemical resistance, toughness, and excellent mechanical properties. Unfortunately, the stabilization of these composite polymeric prostheses in the surrounding hard bone tissues has not proved adequate for prolonged use of these implants. The lack of biological incentive for bone formation at the uppermost surface of these implants has resulted in the failure or limited realization of osteointegration.

Thus far, no effective method of providing a high-strength, permanently stable interface between non-metallic prostheses and bone tissue has been developed. By way of the present invention, it is speculated that formation of direct chemical bonds between organic polymeric surfaces and the inorganic hydroxyapatite may provide the maximum attraction forces. Of the few known forms of direct bonding of two dissimilar substrates, silicon coupling agents have been recognized as providing adhesion where chemical bonding was thought to exist.

The lack of a high-bonding coating for metal or non-metallic implants has prevented the development of a prosthesis that maintains its initial mechanical stability for the extended period of normal usage. The strength of the interface between the prosthesis and the hydroxyapatite coating often weakens as the implant patient grows older and the aggregate amount of wear and tear on the interface increases.

The surface-phosphonylated polymers of the present invention have not heretofore been employed at the interface between hydroxyapatite in the bone tissue and the prostheses. Chain or mass phosphonylated polymers have, however, been known.

Phosphonylation involves the attachment of a —$P(O)Cl_2$ group onto a substrate. Organic polyphosphonates made by the direct polymerization of substituted vinyl monomers have been evaluated as potential preventive agents for dental carriers and as adhesives useful for the restoration of teeth. Specifically, phosphonates are known to adhere to dentin. Furthermore, phosphonylated polyethylene solutions have been studied relative to their adsorption to enamel.

Various patents have been directed to the mass phosphonylation of polymers. Generally, such mass phosphonylation achieves a random dispersion of the phosphonylates throughout the entire polymer mass by phosphonylating the polymer in solution with phosphorus trichloride and oxygen.

For example, U.S. Pat. No. 3,097,194 to Leonard is directed to a process for preparing elastomeric phosphorylated amorphous copolymers of ethylene and propylene which are essentially free of low molecular weight polymer oils. Phosphorylation, or esterification of the copolymer, is conducted in situ in the copolymer solution mass by inactivating a polymerization catalyst with water and oxygen to convert the catalyst to an inert metal oxide. Oxygen is then bubbled through the reaction mass in the presence of phosphorus trichloride to obtain the phosphorylated copolymer.

An example of phosphonated polymers is provided in U.S. Pat. No. 3,278,464 to Boyer et al. In accordance therewith, ethylenically unsaturated polymers are reacted with an organic-substituted phosphorus compound to produce phosphonated polymers. Like the process described in the preceding paragraph, attachment of the phosphorus groups results in near-homogeneous, or mass, phosphonylation wherein the polymer and phosphorus compound are combined in a solvent system.

Moreover, in U.S. Pat. No. 4,207,405 to Masler et al., polyphosphates are provided that are the homogenous reaction products, in an organic solvent, of phosphorus acid or phosphorus trichloride and a water-soluble carboxyl polymer. U.S. Pat. Nos. 3,069,372 to Schroeder et al., 4,678,840 to Fong et al., 4,774,262 to Blanquet et al., 4,581,415 to Boyle, Jr. et al., and 4,500,684 to Tucker show various phosphorus-containing polymer compounds.

U.S. Pat. Nos. 4,814,423 and 4,966,934 to Huang et al. describe adhesives for bonding polymeric materials to the collagen and calcium of teeth. For bonding to calcium, the adhesive employs an ethylenically unsaturated polymeric monophosphate component. A tooth is coated with the adhesive and then a filling is applied.

Although various phosphonylated polymers are known, the particular features of the present invention are absent from the art. The prior art is generally deficient in affording methods for producing a preformed solid polymer having phosphorus-containing groups covalently attached to only its surface, or near-surface, carbons. By providing an organic polymer preform having surface phosphonylation, the present invention allows high-strength organic polymer prostheses with custom-tailored stiffness to be employed as orthopedic implants. The hydroxyapatite-like phosphonylated surfaces on the preformed polymers may bind chemically to the hydroxyapatite found in bone tissue to form durable and strong implant/bone interfaces. Although primarily useful in the orthopedic implant field, the surface-phosphonylated polymers of the present invention also have potential applications in controlled drug delivery and attachment of cells such as fibroblast. For infectious microorganisms associated with device-centered infections, phosphonylated surfaces can provide controlled interaction with implantable devices. Other applications include the use of phosphonylated surfaces in the development of chromatographic, electronic, and conductive devices, and sensors and devices for isolation and/or purification of important proteins such as growth factors.

SUMMARY OF THE INVENTION

It is an object of the present invention to provide a method for treating an organic polymer preform to produce a phosphonylated surface thereon.

Another object of the present invention is to provide a hydroxyapatite-like surface on a prosthesis for cementless implantation.

Yet another object of the present invention is to provide an organic polymeric preform having phosphorus-containing groups on its surface, but not substantially elsewhere in the preform.

A further object of the present invention is to provide a phosphonylated organic polymeric substrate comprising an organic polymeric preform that has up to about 30 percent of the original reactive carbon sites therein phosphonylated.

It is yet another object of the present invention to provide an organic polymeric implant having a phosphonylated surface.

Another object of the present invention is to provide a surface-phosphonylated organic polymer wherein the phosphonyl groups attached to the surface thereof are capable of being converted to metal salts, phosphonic acids, esters and amides.

Generally speaking, the present invention involves the process of phosphonylating the surface of a preformed organic polymer. The organic polymer may be in the form of a block, a film, fibers, fabrics, foams, or the like. In one particular embodiment, the preform is an organic polymeric prosthesis. Phosphonylation can occur in either a liquid phase or a gas phase reaction. Liquid phase phosphonylation typically occurs by treating the preformed organic polymer with phosphorus trichloride in the presence of a solvent and oxygen. The solvent chosen must not dissolve, or etch, the preformed organic polymer but must dissolve the phosphorus trichloride without reacting therewith. Gas phase phosphonylation, on the other hand, takes place by treating the preformed organic polymer with gaseous phosphorus trichloride and oxygen. In both methods, dichlorophosphonyl groups are formed on the surface of the preformed organic polymer. One application of the surface-phosphonylated polymers provides a hydroxyapatite-like surface on organic polymeric implants which, during implantation, provide a surface for natural hydroxyapatite to crystallize on the preformed polymer and, hence, induce osteointegration.

DESCRIPTION OF THE PREFERRED EMBODIMENTS

Novel surface-phosphonylated preformed organic polymers which may be used in various applications are provided. The invention described herein relates to the production of highly reactive polymeric surfaces which are particularly useful in the orthopedic field for bone implantation.

Specifically, various polymeric surfaces including, without limitation, polyethylene films, ultra-high molecular weight polyethylene films and fibers, polyvinylidene fluoride films, poly (methyl methacrylate) films, polystyrene films, nylon 12 films and fibers, various polyesters and polyacrylates, polyetheretherketones, aromatic polyamides, polyethylene terephthalate fibers and films, poly (tetramethylene terephthalate) films, and polyether-esters of poly (tetramethylene terephthalate) may be employed as the substrate. The surface of the substrate is made highly reactive by the process of direct phosphonylation.

Generally, liquid phase phosphonylation of the preformed polymer occurs by bubbling oxygen through a phosphorus halide solution, such as $PCl_3$ in a solvent. Gas phase phosphonylation also occurs in the presence of oxygen and a phosphorus halide. In either case, the reactive groups may then be converted to their corresponding metal salts, phosphonic acids, amides or esters. Conversion to phosphonates is achieved by reacting with an inorganic base, to phosphonic acids by reacting with water or a dilute acid, to amides by reacting with an amine, and to esters by reacting with an alcohol.

The attachment of a —P(O)Cl$_2$, —P(O)(OH)$_2$, —P(OR)$_2$ or —P(NR)$_2$ group onto such polymeric substrates form highly reactive surfaces for various applications. For example, such highly reactive phosphonylated polymeric surfaces may be used for growing hydroxyapite crystals onto the surfaces of the polymers. Ion-exchange and binding capabilities allow the new phosphonylated organic substrates to be used in various environments whenever a highly reactive surface is required. For example, when the phosphonylated surfaces are hydrolyzed to provide an acidic functionality, such substrates may be used in the making of low-friction articulating joints, in chromatography to bind metal ions, in various catalytic binding processes, and to bind any organic molecule through an ion-exchange mechanism. Basically, any substance that will bind to an acidic surface through transient ionic-type exchange may be utilized with the inventive substrate. Furthermore, the inventive polymer may provide more printable substrates and may also be used as an adhesive surface for adhering to various polymers so that nonpolar and polar molecules may be bound thereto. As mentioned above, other areas in which applications for such phosphonylated substrates may be utilized include biologically active, covalently-bound drugs or proteins.

An important application of the present invention, however, is in the creation of orthopedic implants that allow bone ingrowth by formation of hydroxyapatite crystals on the implant surface. The phosphonylated substrates provide a hydroxyapatite-like structure on the polymer surface that will form a uniform interface with hydroxyapatite found in bone tissue. The phosphonylated surfaces are chemically similar to hydroxyapatite in that phosphorus atoms have oxygen and hydroxyl groups attached thereto. A polymeric preform, such as a polyethylene film, is substituted in place of the third hydroxyl group found in most hydroxyapatite. When the phosphonyl groups are converted to phosphonic acid, a calcium salt thereof may then be formed that is very similar in structure and activity to hydroxyapatite.

Unlike the known phosphonylation processes which result in total, or mass, phosphonylation of the polymer, the present inventive process allows for surface phosphonylation on a preformed organic polymer. Typical polymer phosphonylations previously known involve solution phosphonylation. Such polymers are typically dissolved in phosphorus trichloride and oxygen is bubbled therethrough for mass phosphonylation in a polymer solution. If such prior art polymers were employed as implants or in the other applications relevant to the present invention, the physical and mechanical integrity would be negatively affected due to the high reactivity of the phosphonylated groups within the polymer mass.

In the present inventive process, surface phosphonylation is achieved by a liquid phase or gas phase reaction. In liquid phase phosphonylation, a solvent is employed that dissolves the phosphorus halide but which will not dissolve the preformed polymer. The solvent chosen must also be non-reactive with the phosphorus halide. Generally, appropriate solvents include the fully-halogenated liquid solvents because they lack a reactive hydrogen. Specific solvents include carbon tetrachloride, hexachloroethylene, hexafluoroethylene, tetrachloroethylene and carbon tetrabromide.

Although only phosphorus trichloride is described in the Examples below as the preferred phosphorus halide, other phosphorus halides, such as phosphorus bromide, and the like, may be employed for phosphonylation. Like the solvent in liquid-phase phosphonylation, the phosphorus halides are fully-halogenated so that they lack a reactive hydrogen.

In liquid-phase phosphonylation, oxygen is passed or bubbled through a reaction vessel containing the preformed organic polymer, the phosphorus trichloride and the solvent. Phosphonylation of the surfaces of the preformed polymer are achieved thereby. The phosphonylated polymer may then be rinsed with more of the solvent, cleaned, and prepared for further uses.

The reaction diagram for liquid-phase phosphonylation of the surface of a preformed polymer of polyethylene is as follows:

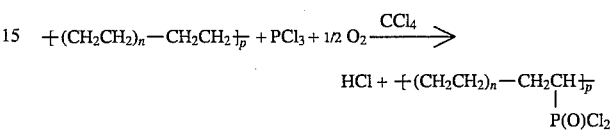

In gas-phase phosphonylation, the preformed polymer is placed in a reaction chamber containing gaseous phosphorus trichloride. Oxygen is then introduced causing phosphonylation of the surfaces of the preformed polymer. The phosphonylated polymer may then be rinsed in a fully-halogenated liquid solvent, such as carbon tetrachloride or any other liquid which can remove traces of PCl$_3$ without etching the polymeric substrate. Preferably, the gas-phase produced polymer is rinsed in hexane thereafter.

The present phosphonylated organic polymeric substrate is characterized by the fact that the majority of phosphonylation occurs on the surface thereof. Such surface phosphonylation is quantitatively characterized by the percent of carbons having a phosphonyl group attached thereto. In quantitative terms, surface phosphonylation is defined as having up to about 30 percent, but preferably up to about 20 percent, of the reactive carbon atoms with a phosphonyl group appended thereto. The reactive carbons are those carbons which have an available hydrogen which may be substituted or an available valency for adding a dichlorophosphonyl group thereto.

As used herein, surface phosphonylation refers to the phosphonylation of the surface of the organic preforms used in the present invention. Surface phosphonylation, however, does not exclude phosphonylation of a minimal number of reactive carbon sites located beneath the surface of the preformed polymers. Surface activation of polymeric substrates to eventually yield hydroxyapatite-like surfaces ensure that when such phosphonylated polymers are used as orthopedic implants, the strength and other relevant mechanical properties of the implant itself are not altered. If mass phosphonylation occurs, as opposed to surface phosphonylation, the strength of the polymer implant would be severely altered and the polymer may dissolve in the biological environment.

To ensure that surface phosphonylation is occurring, only up to about 30 percent of the total mass of the polymeric preform, or up to about 30 percent of the total number of reactive carbon sites, should be phosphonylated. If more than 30 percent of the reactive carbons are phosphonylated, delamination of the polymeric preform may occur and breakup and dissolution of the preformed polymer begins. In the present inventive process, the extent of phosphonylation is controlled by the amount of phosphorus trichloride used and the rate of oxygenation. Delamination of the polymeric preform layers may begin if such amounts are not kept to the minimum required for surface-only phosphonylation. Moreover, agitation should be kept to a minimum in the liquid-phase reaction to prevent mass phosphonylation.

According to the teachings of the present invention, the phosphonyl groups attached to the surface of the substrates herein may be hydrolyzed to yield acidic reactive surfaces and salts thereof. Hydrolysis is achieved by placing the phosphonylated substrate into water in the presence of a base, such as sodium hydroxide. The reaction diagram for hydrolyzing a phosphonylated polyethylene to achieve the corresponding metal phosphonate, of which sodium phosphonate is an example, is as follows:

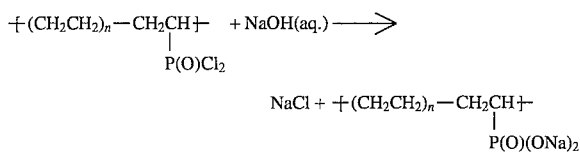

As described above, hydroxyapatite is a calcium salt. Preferably, the phosphonylated surface is converted to a calcium salt when used as an orthopedic implant. The calcium salt form of the phosphonylated surface allows hydroxyapatite to co-crystalize as part of the process for integrating with bone tissues. After such integration, the hydroxyapatite of the prosthesis meshes with the hydroxyapatite-like phosphonylated groups on the implant to form an almost continuous layer of hydroxyapatite. Thereby, a mechanically stable and high-strength bond between prosthesis and bone tissue is created.

Alternatively, the phosphonylated preform may be converted to its phosphonic acid moiety by placing the phosphonylated polymer in water or a dilute acid such as hydrochloric acid. The reaction diagram for converting one phosphonylated preform to its phosphonic acid moiety using hydrochloric acid is as follows:

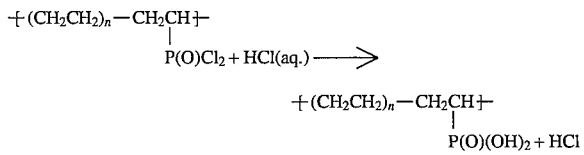

As illustrated herein, both homochain polymers, such as polyethylene and polypropylene, and heterochain polymers, such as the aromatic polyethers and nylon 12, may be phosphonylated according to the process of the present invention. A modified process was used for phosphonylating the surface of PEEK and entailed the introduction of a Lewis acid, such as stannic chloride, to the reaction solution. The present process allows for new chemical bonds to be formed between the phosphonylated polymeric surfaces and the compounds to which they are bound. The ionic interaction provided by the present invention allows for chemical bonding which results in stronger interfacial strengths than the previously-known mechanical bonds.

The present invention may be better understood by reference to the following examples. The examples are merely exemplary of various organic polymeric preforms that may be phosphonylated according to the teachings of the present invention and are not meant to be limiting in any manner.

EXAMPLE 1

A high-density polyethylene film was made according to well-known methods. To phosphonylate the surface of the polyethylene film, film was placed in a glass reaction vessel containing 90 percent (by volume) carbon tetrachloride and 10 percent (by volume) phosphorus trichloride. Oxygen was dispersed through the solution at a pressure of about 10 mm Hg for four hours at 25° C. After phosphonylation, the film was sonicated for about 1 hour in carbon tetrachloride, followed by a thorough rinsing, initially in carbon tetrachloride and then in acetone. Finally, the phosphonylated film was washed and rinsed in distilled water and dried under vacuum.

The phosphonylated polyethylene surfaces were characterized using EDX (energy dispersive x-ray) and IR spectra. The data showed the presence of both phosphorus and chlorine in approximately a 1:2 ratio as expected to demonstrate phosphonylation of the polyethylene surface.

EXAMPLE 2

The phosphonylated polyethylene made according to the process of Example 1 was then converted to the corresponding potassium phosphonate metal salt. The phosphonyl chloride groups were converted through an ion exchange as follows. The phosphonylated polyethylene films made according to Example 1 were placed in a glass container containing a solution of 7 percent (by volume) potassium hydroxide, 13 percent (by volume) distilled water, and 80 percent (by volume) ethanol. The phosphonylated films remained in this solution in an unagitated state at 25° C. for 48 hours. The films were then rinsed in distilled water and dried under vacuum. Replacement of the chlorine ions by potassium ions was verified using EDX analysis as described above.

EXAMPLE 3

The phosphonylated polyethylene made according to Example 1 was then converted to the corresponding calcium phosphonate metal salt as follows. The polyethylene films made according to Example 1 were placed in a glass container containing 20 percent (by volume) anhydrous calcium chloride and 80 percent (by volume) distilled water. The films remained in this solution in an unagitated state at 25° C. for 48 hours. The films were then rinsed in distilled water and dried under a vacuum. The conversion of the phosphonyl chloride groups on the polyethylene surface to calcium phosphonate groups was confirmed using EDX analysis as described above.

EXAMPLE 4

The phosphonyl chloride groups on the polyethylene surface were converted to phosphonic acid as follows. The phosphonylated films made according to Example 1 were placed in hydrochloric acid (37 percent) in an unagitated state at 25° C. for 8 hours. The films were then rinsed in distilled water and dried under vacuum. The presence of phosphonic acid on the surface was confirmed using contact angle measurements and IR analysis.

EXAMPLE 5

The phosphonylated high density polyethylene film made according to Example 1 was tested for phosphorus content using electron spectroscopy chemical analysis (ESCA). ESCA is a type of analysis which determines the atomic ratio of particular elements found at the surface of a particular material.

Here, an ESCA test was performed on the surface of the phosphonylated polyethylene film for determining the atomic ratio of phosphorus to carbon. As used in this example, the surface refers to the upper most layers of atoms in the polyethylene film. The following result was obtained:

1. Atomic ratio of phosphorus to carbon=2.48/62.52= 0.0397 or 3.97% or, in other words, 1 out of every 27 carbon atoms was bonded to a phosphorus atom at the surface of the film.
2. Using proper conversion factors, the above atomic ratio can be mathematically converted to the mass ratio or weight percent of phosphorus to carbon: 79.36/750.24= 0.1057 or 10.57%

For purposes of comparison, a bulk analysis of the entire phosphonylated polyethylene film was performed. Specifically, Galbraith Laboratories, Inc. in Knoxville, Tenn. performed an elemental analysis on the polyethylene film for determining the mass ratio of phosphorus to carbon and hydrogen over the entire thickness of the film.

1. Mass ratio or weight percent of phosphorus to carbon and hydrogen=1/476.2=0.21%
2. This ratio was then mathematically converted to the mass ratio or weight percent of phosphorus to carbon only: 14/5714.4=0.0025=0.25%

Comparing the mass ratio or weight percent of phosphorus to carbon at the surface (10.57%) to the mass ratio or weight percent of phosphorus to carbon over the entire depth of the film (0.25%), the results indicate that phosphonylation occurred predominately at the surface.

EXAMPLE 6

Films of nylon 12 were phosphonylated according to the method used in Example 1 to phosphonylate the polyethylene films. Characterization of the nylon 12 films was done using EDX data which showed phosphorus and chloride ions present in the expected 1:2 ratio.

EXAMPLE 7

The phosphonylated nylon 12 surfaces prepared in Example 6 were converted to the corresponding potassium phosphonates using the same procedures utilized in Example 2 to convert the phosphonyl chloride groups on the polyethylene films to their corresponding potassium phosphonates. EDX data confirmed replacement of the chloride ions with potassium ions.

EXAMPLE 8

The phosphonyl chloride groups on the surface of the nylon 12 films made according to Example 7 were converted to the corresponding calcium phosphonate groups using the process utilized in Example 3. EDX data confirmed replacement of the potassium ions with calcium ions.

EXAMPLE 9

Polyetheretherketone (PEEK) films were phosphonylated as follows. Films of extruded PEEK (obtained from ICI Films) were placed in a glass container containing 90 percent (by volume) carbon tetrachloride 10 percent (by volume) phosphorus trichloride, and 1 ml tin (IV) chloride (also known as stannic chloride). Oxygen was dispersed through the container at a pressure of 10 mm Hg at 24° C. for 3 hours. After phosphonylation, the films were sonicated for about 1 hour in carbon tetrachloride, followed by a thorough rinsing, first in carbon tetrachloride and then in distilled water, and drying under vacuum. Characterization of the PEEK surface was confirmed using EDX. The data showed the presence of both phosphorus and chlorine ions on the surface thereof as expected.

EXAMPLE 10

Gas phase, surface phosphonylation of polyethylene film was accomplished by the following method. Ten drops of phosphorus trichloride was placed in a glass reaction vessel and sealed with an elbow and a stopcock. A polypropylene non-woven fabric was then placed into the glass reaction vessel and a one-inch square sample of polyethylene film was placed on the fabric. The fabric was used to prevent contact between the polyethylene film and the liquid phosphorus trichloride. Next, a vacuum source was connected to the stopcock. A valve was opened and a vacuum was applied for less than 30 seconds in order to gasify the phosphorus trichloride. Oxygen, which was also connected to the stopcock, was then fed to the glass reactor for about five seconds. This process resulted in an oxygen atmosphere of slightly less than atmospheric pressure. The vacuum was then reapplied for about 10 seconds to lower the pressure in the glass reaction vessel further. The valve was then closed and the glass reactor was incubated for four hours at room temperature. After incubating, the polyethylene film was removed from the reactor vessel and washed and sonicated in carbon tetrachloride for 15 minutes. The sample was then washed and sonicated again for 15 minutes in hexane.

The phosphonylated polyethylene film was characterized using EDX. The data showed the presence of both phosphorus and chlorine.

EXAMPLE 11

Polyethylene film was also gas phosphonylated at atmospheric pressure. Specifically, the process as described in Example 10 was followed. However, after oxygen was fed to the vessel and the vacuum was then reapplied, additional oxygen was fed for about five more seconds. The valve was then opened to the atmosphere reaching ambient pressure. The valve was then closed and the vessel was incubated for four hours at room temperature. After incubating, the sample was washed and sonicated in carbon tetrachloride and hexane as before.

The phosphonylated polyethylene surfaces were characterized using EDX. The data showed the presence of both phosphorus and chlorine.

EXAMPLE 12

The phosphonylated polyethylene film made according to the process of Example 10 was then converted to the corresponding calcium phosphonate salt as follows. The phosphonylated polyethylene film sample was incubated for three hours in a four weight percent calcium hydroxide solution/dispersion at 80° C. The sample was then washed and sonicated for 30 minutes in distilled water. The conversion of the phosphonyl chloride groups on the polyethylene film surface to calcium phosphonate groups was confirmed using EDX analysis as described above.

EXAMPLE 13

The phosphonlylated polyethylene film made according to Example 11 was also converted to the corresponding calcium phosphonate salt following the process as described in Example 12. The conversion of the phosphonyl chloride groups on the polyethylene film surface to calcium phosphonate groups was again confirmed using EDX analysis.

EXAMPLE 14

A one-inch square polyether-ether ketone (PEEK) film was phosphonylated according to the process of Example 10. The presence of both phosphorus and chlorine ions on the surface of the PEEK film was confirmed using EDX.

EXAMPLE 15

A one-inch square polyether-ether ketone (PEEK) film was phosphonylated according the process of Example 11. The presence of both phosphorus and chlorine ions on the surface of the PEEK film was confirmed using EDX.

EXAMPLE 16

The phosphonylated PEEK film made according to Example 14 was converted to the corresponding calcium phosphonate salt following the process as described in Example 12. The conversion of the phosphonyl chloride groups on the PEEK film surface to calcium phosphonate groups was confirmed using EDX analysis.

EXAMPLE 17

The phosphonylated PEEK film made according to Example 15 was converted to the corresponding calcium phosphonate salt following the process as described in Example 12. The conversion of the phosphonyl chloride groups on the PEEK film surface to calcium phosphonate groups was confirmed using EDX analysis.

EXAMPLE 18

A one-inch square non-woven polypropylene was phosphonylated according the process of Example 10. The presence of both phosphorus and chlorine ions on the surface of the non-woven polypropylene was confirmed using EDX.

EXAMPLE 19

A one-inch square non-woven polypropylene was also phosphonylated according to the process of Example 11. The presence of both phosphorus and chlorine ions on the surface of the non-woven polypropylene was confirmed using EDX.

EXAMPLE 20

The phosphonylated non-woven polypropylene made according to Example 18 was converted to the corresponding calcium phosphonate salt following the process as described in Example 12. The conversion of the phosphonyl chloride groups on the non-woven polypropylene surface to calcium phosphonate groups was confirmed using EDX analysis.

EXAMPLE 21

The phosphonylated non-woven polypropylene made according to Example 19 was converted to the corresponding calcium phosphonate salt following the process as described in Example 12. The conversion of the phosphonyl chloride groups on the non-woven polypropylene surface to calcium phosphonate groups was confirmed using EDX analysis.

EXAMPLE 22

A thin wafer of PEEK-carbon fiber composite was phosphonylated according to the process of Example 10. The presence of both phosphorus and chlorine groups on the surface of the wafer was confirmed using EDX.

EXAMPLE 23

A thin wafer of PEEK-carbon fiber composite was phosphonylated according to the process of Example 11. The presence of both phosphorus and chlorine ions on the surface of the wafer was confirmed using EDX.

EXAMPLE 24

The phosphonylated PEEK-carbon fiber composite wafer made according to Example 22 was also converted to the corresponding calcium phosphonate salt following the process as described in Example 12. The conversion of the phosphonyi chloride groups on the PEEK-carbon fiber composite wafer surface to calcium phosphonate groups was again confirmed using EDX analysis.

EXAMPLE 25

The phosphonylated PEEK-carbon fiber composite wafer made according to Example 23 was converted to the corresponding calcium phosphonate salt following the process as described in Example 12. The conversion of the phosphonyl chloride groups on the PEEK-carbon fiber composite wafer surface to calcium phosphonate groups was again confirmed using EDX analysis.

EXAMPLE 26

The following tests were run in order to verify that the majority of phosphonylation occurs at the surface of the polymer substrates during the liquid and gas phase phosphonylations described above.

First, a piece of thick polyethylene (PE) film, approximately 0.057 mm thick, was heat sealed about its edges to a piece of thin polyethylene film, approximately 0.025 mm thick. The films, sealed together at the edges, formed a pocket defining a sealed hollow cavity therein. The pocket was then subjected to gas phase phosphonylation.

Specifically, 10 drops of $PCl_3$ were placed into a flask. Glass wool was added to the flask and the polyethylene pocket was placed on the glass wool. A vacuum was supplied to the flask for five seconds. Next, oxygen was fed to the flask for five seconds. Application of the vacuum and addition of the oxygen were repeated for respective five second intervals. A valve on top of the flask was opened to the atmosphere and then quickly closed in order to ensure that the contents of the flask were at ambient pressure in an oxygen rich environment. The pocket was left in the flask for 3.5 hours and then removed and sonicated in deionized water for 15 minutes. The pocket was allowed to dry.

After drying, the pocket was cut open and each side of the thick polyethylene film and each side of the thin polyethylene film was characterized using EDX. The following results were obtained:

| Sample | Phosphorus Counts (EDX) | Reduction of Phosphorus (%) |
|---|---|---|
| Outside Surface of Thick PE film | 3371 | — |

| Sample | Phosphorus Counts (EDX) | Reduction of Phosphorus (%) |
|---|---|---|
| Inside Surface of Thick PE film | 543 | 83.9 |
| Outside Surface of Thin PE film | 4152 | — |
| Inside Surface of Thin PE film | 1402 | 66.2 |

As shown from the results above, higher phosphorus counts were observed on the outside surfaces of the pocket: the surfaces in contact with the $PCl_3$. Accordingly, phosphorus amounts decreased from the exterior surface of the film to the interior surface of the film. In fact, as shown above, 60 to 80 percent reductions in phosphorus counts were observed on the interior of the pocket when compared to the outside surfaces. As such, phosphonylation was predominately limited to the exterior surfaces of the pocket.

EXAMPLE 27

A similar polyethylene film pocket as used in Example 26 was subjected to liquid phase phosphonylation. Specifically, the polyethylene film pocket was wrapped in glass wool around the stem of a bubbler apparatus and placed into a solution containing 5 percent by volume $PCl_3$ and 95 percent by volume $CCl_4$. Oxygen was allowed to bubble up through the liquid solution for five minutes. The pocket was then removed and sonicated in deionized water for 15 minutes. After drying, the outside and inside surfaces of the polyethylene pocket were characterized using EDX. The following results were obtained:

| Sample | Phosphorus Counts (EDX) | Reduction of Phosphorus (%) |
|---|---|---|
| Outside Surface of Thick PE film | 140 | — |
| Inside Surface of Thick PE film | 100 | 28.6 |
| Outside Surface of Thin PE film | 163 | — |
| Inside Surface of Thin PE film | 72 | 55.8 |

Similar to gas phase phosphonylation, the above results show that a greater amount of phosphonylation occurred at the exterior surface of the pocket than occurred at the interior surface.

EXAMPLE 28

A solid block of polyethylene was subjected to the gas phase phosphonylation process of Example 26. After drying, four sides of the block (excluding the ends) were shaved off a predetermined distance. Three layers were then sliced off one end of the polyethylene block. The outside surface of each layer was characterized using EDX. The following results were obtained.

| Sample | Depth (mm) | Phosphorus Count (EDX) |
|---|---|---|
| Layer 1 | 0.000 | 629 |
| Layer 2 | 0.270 | 160 |
| Layer 3 | 0.439 | none detected |

The results show that phosphonylation did not occur more than 0.439 mm from the surface.

EXAMPLE 29

As stated above, the process of the present invention includes using a phosphorus halide to carry out phophonylation. Preferably, phosphorus trichloride ($PCl_3$) is used. The following test was performed in order to compare the use of $PCl_3$ with the use of phosphorus oxychloride ($POCl_3$) to phosphonylate polypropylene fibers.

Polypropylene (PP) fibers (40 denier) cut from a spool were subjected to the liquid phase phosphonylation process of Example 27.

Similar polypropylene fibers were phosphonylated using $POCl_3$. First, liquid $POCl_3$ was heated to 40° C. The polypropylene fibers were placed in the liquid for 5 minutes and then sonicated in deionized water for 15 minutes. The fibers were then dried.

The polypropylene fibers phosphonylated using $PCl_3$, the polypropylene fibers phosphonylated using $POCl_3$, and control fibers not phosphonylated were characterized using EDX. The strength, elongation, and tenacity of the three sets of fibers were tested using an Instron machine. Approximately ten fibers were tested from each set. The Instron machine test parameters are as follows:

| | |
|---|---|
| Sample Rate (pts/sec): | 9.103 |
| Crosshead Speed (mm/min) | 100 |
| Full Scale Load Range (kg) | 5 |
| Humidity | 65% |
| Temperature | 70° F. |
| Gauge length of fiber (approx.) | 4 inches |

The following results were obtained:

| Sample | Phosphorus Counts (EDX) | Average Load Break (gm) | Average elongation (%) | Average Tenacity gm/denier | Load Break (std dev) | % elongation (std dev) |
|---|---|---|---|---|---|---|
| Control PP fibers | 0 | 1793 | 24.69 | 44.82 | 26 | .66 |
| PP fibers ($PCl_3$) | 2295 | 1750 | 24.91 | 43.76 | 37 | .52 |
| PP fibers ($POCl_3$) | 2275 | 1562 | 25.34 | 39.05 | 57 | 2.95 |

The above results show that polypropylene fibers phosphonylated with $PCl_3$ retained more strength than similar polypropylene fibers phosphonylated with $POCl_3$. Also, from examining the standard deviation, the polypropylene fibers phosphonylated with $PCl_3$ were more uniform in strength and elongation than the fibers phosphonylated with POCl$_3$.

It should be understood that the present invention is not limited to phosphonylation of the specific organic polymers described herein. Any organic polymer having the available reactive carbon sites on the surface of a solid preform made therefrom falls within the scope of the present invention. Synthesis routes of the specific polymers phosphonylated as described herein are merely exemplary so as to enable one of ordinary skill in the art to phosphonylate the preformed polymers of the present invention. It will be understood also that while the form of the invention shown and described herein and described constitutes a preferred embodiment of the invention, it is not intended to illustrate all possible forms of the invention herein. The words used are words of description rather than of limitation. Various changes and variations may be made to the present invention without departing from the spirit and scope of the following claims.

What is claimed is:

1. A method for treating an organic polymer preform to produce a phosphonylated surface thereon, said method comprising the steps of:

exposing the surface of an organic polymer preform to a gas containing a phosphorus trihalide; and feeding controlled amounts of oxygen for phosphonylation of the surface of said preform, so that phosphonylation substantially occurs at the surface of said preform and so that a selective amount of reactive carbon atoms contained within said preform are reacted with said phosphorus trihalide, said amount being greater than zero and less than about 30 percent of said carbon atoms.

2. The method as defined in claim 1, further comprising the step of converting said preform having a phosphonylated surface to a metal phosphonate by reacting said organic polymer preform having a phonsphonylated surface with an inorganic base.

3. The method as defined in claim 2, wherein said inorganic base is selected from the group consisting hydroxides, carbonates, and bicarbonates.

4. The method as defined in claim 2, wherein said metal phosphonate is calcium phosphonate.

5. The method as defined in claim 1, further comprising the step of converting said preform having a phosphonylated surface to a phosphonic acid.

6. The method as defined in claim 1, wherein said phosphorus trihalide is selected from the group consisting of phosphorus trichloride and phosphorus tribromide.

7. A method for treating an organic polymer form to produce a phosphonylated surface thereon comprising the steps of:

placing said preform in a gaseous environment wherein said gaseous environment includes a phosphorus trihalide; and adding oxygen to said gaseous environment to phoephonylate said surface of said preform so that a selective amount of carbon atoms contained within said preform are reacted with said phosphorus trihalide, said amount being greater than zero and less than about 30 percent of said carbon atoms.

8. The method of claim 7 further comprising the step of converting said preform having a phosphonylated surface to a metal phosphonate by reacting said organic polymer preform having a phosphonylated surface with an inorganic base.

9. A method for treating an organic polymeric preform to produce a phosphonylated surface thereon comprising the steps of:

placing said preform in a reaction chamber where phosphonylation occurs, said reaction chamber containing a gaseous environment, said gaseous environment including phosphorus trichloride in a gaseous form and oxygen for phosphonylation of said surface of said preform, wherein a selective amount of carbon atoms contained within said preform are reacted with said phosphorus trichloride, said amount being greater than zero and less than about 30 percent of said carbon atoms.

10. The method as defined in claim 9 where said reaction chamber permits the pressurization of said gaseous environment.

11. The method as defined in claim 9, further comprising the step of converting said preform having a phosphonylated surface to a calcium phosphonate by reacting said polymeric preform having a phosphonylated surface with an inorganic base.

12. The method as defined in claim 7, further comprising the step of converting the phosphorus groups located on said phosphonylated surface to a phosphonic acid.

13. The method as defined in claim 7, wherein said phosphorus trihalide is selected from the group consisting of phosphorus trichloride and phosphorus tribromide.

14. The method as defined in claim 9, further comprising the step of converting the phosphorus groups located within said phosphonylated surface to a phosphonic acid.

* * * * *